United States Patent [19]
Hainer

[11] Patent Number: 5,779,293
[45] Date of Patent: Jul. 14, 1998

[54] QUICK CHANGE REVERSIBLE SHOVEL

[76] Inventor: Brian J. Hainer, 260 Tyler St., East Haven, Conn. 06512

[21] Appl. No.: 616,155

[22] Filed: Mar. 14, 1996

[51] Int. Cl.$^6$ ..................................... E01H 5/02
[52] U.S. Cl. ............................ 294/54.5; 294/51
[58] Field of Search ............... 294/49, 51, 54.5, 294/55, 57; 37/241, 265, 284, 285; 171/371, 381

[56] References Cited

U.S. PATENT DOCUMENTS

| | | | |
|---|---|---|---|
| 760,639 | 5/1904 | Menzies | 294/54.4 |
| 813,983 | 2/1906 | Luney | 294/54.5 |
| 1,176,112 | 3/1916 | Volkstadt | 294/54.5 |
| 1,634,204 | 6/1927 | Nims | 294/54.5 |
| 3,198,565 | 8/1965 | Ellis | 294/54.5 |
| 3,727,964 | 4/1973 | Nordvik | 37/285 X |
| 5,039,151 | 8/1991 | Davis | 294/54.5 |

*Primary Examiner*—Johnny D. Cherry

[57] ABSTRACT

A quick change reversible shovel is disclosed. The shovel comprises a handle of a cylindrical cross-section and of an extended length having a lower attachment end and having an upper gripping end. The handle has a central axis which is linear over the majority of its length and a small bent portion at the first or attachment end. A grip is formed over the handle at the grip end for being held by a user. A blade in a generally rectangular configuration but with a symmetric curve is provided. The blade is thicker along a horizontal center line and comes to a point at the opposite upper and lower ends. The blade has curved side edges parallel with each other coupling the upper and lower edges at the blades. A pair of apertures is formed in the central extent of the blade along the horizontal center line. Attachment mechanism include a ring-like member positionable around the lower end of the handle with an opening. The opening is in contact with the rear face of the blade between the apertures. The ring then has a pair of outwardly extending flanges in a common plane parallel with the rear face of the shovel each with an aperture overlying the aperture of the blade.

3 Claims, 2 Drawing Sheets

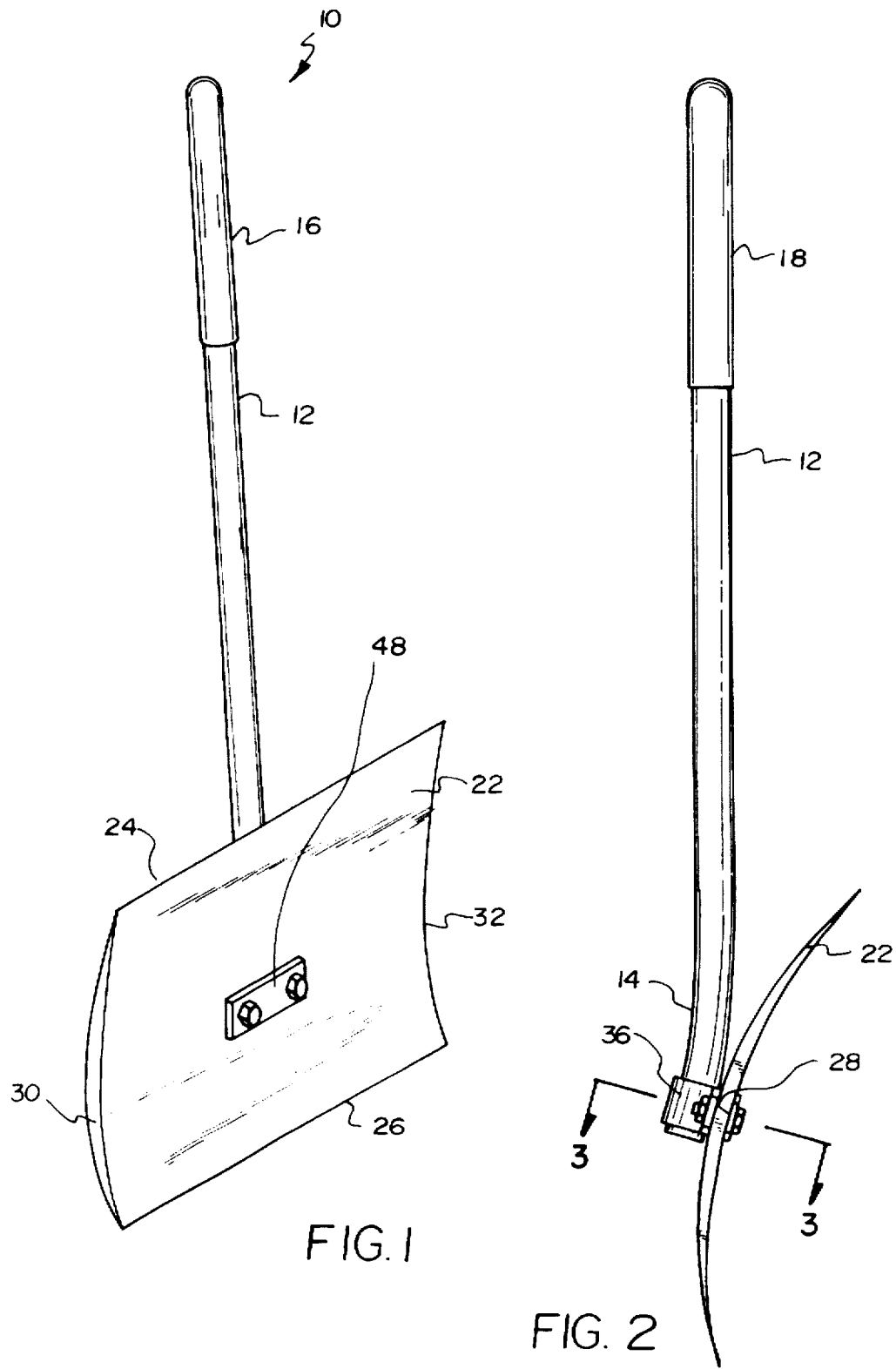

QUICK CHANGE REVERSIBLE SHOVEL

BACKGROUND OF THE INVENTION

1. Field of the Invention

The present invention relates to a new and improved quick change reversible shovel and, more particularly, pertains to removing and replacing a two-ended shovel blade on a handle for using either end to increase the life of the device.

2. Description of the Prior Art

The use of shovels of various designs and configurations is known in the prior art. More specifically, shovels of various designs and configurations heretofore devised and utilized for the purpose of increasing the life of shovels through various methods and apparatuses are known to consist basically of familiar, expected, and obvious structural configurations, notwithstanding the myriad of designs encompassed by the crowded prior art which has been developed for the fulfillment of countless objectives and requirements.

The prior art discloses a large number of devices for removing and replacing a two-ended shovel blade to increase the life of the device on a handle for using either end to increase the life of the device. By way of example, U.S. Pat. No. 4,153,287 to Towsend discloses a shovel blade having bristles extending from the lower surface of the blade and a handle arranged for use of the blade and/or bristles together or independently.

U.S. Pat. No. 4,357,043, also to Towsend, discloses a combined brush and cutter attachment for a shovel blade.

U.S. Pat. No. 5,228,734 to Possastro discloses an expandable snow shovel device having a series of interconnected sections.

U.S. Pat. No. 5,306,061 to Ives discloses a shovel device having a series of spaced parallel ribs and a grid work associated therewith.

Lastly, U.S. Pat. No. 5,313,735 to Latouche discloses a rotatable handle extension for fishing rods and the like.

In this respect, the quick change reversible shovel according to the present invention substantially departs from the conventional concepts and designs of the prior art, and in doing so provides an apparatus primarily developed for the purpose of removing and replacing a two-ended shovel blade to increase the life of the device on a handle for using either end to increase the life of the device.

Therefore, it can be appreciated that there exists a continuing need for a new and improved quick change reversible shovel which can be used for removing and replacing a two-ended shovel blade to increase the life of the device on a handle for using either end to increase the life of the device. In this regard, the present invention substantially fulfills this need.

SUMMARY OF THE INVENTION

In view of the foregoing disadvantages inherent in the known types of shovels of various designs and configurations now present in the prior art, the present invention provides an improved quick change reversible shovel. As such, the general purpose of the present invention, which will be described subsequently in greater detail, is to provide a new and improved quick change reversible shovel and methods which have all the advantages of the prior art and none of the disadvantages.

To attain this, the present invention essentially comprises a new and improved quick change reversible shovel for removing and replacing a two-ended shovel blade on a handle comprising, in combination, a handle of a cylindrical cross-section and of an extended length having a lower attachment end and having an upper gripping end, the handle having a central axis which is linear over the majority of its length and a small bent portion at the first or attachment end, the angle being at between about 5 and 15 degrees from the axis of the major portion of the handle; a grip formed over the handle at the grip end for being held by a user; a blade in a generally rectangular configuration but with a symmetric curve, the blade being thicker along a horizontal center line and coming to a point at the opposite upper and lower ends, the blade having curved side edges parallel with each other coupling the upper and lower edges at the blades, a pair of apertures formed in the central extent of the blade along the horizontal center line; and attachment means including a ring-like member positionable around the lower end of the handle with an opening constituting between about 15 and 30 percent of the periphery of the ring, the opening being in contact with the rear face of the blade between the apertures, the ring then having a pair of outwardly extending flanges in a common plane parallel with the rear face of the shovel each with an aperture overlying the aperture of the blade, the coupling components further including a small plate with a pair of apertures overlying the apertures of the blade with associated bolts positionable through the apertures of the plate, blade and flanges with associated bolts for securement purposes.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved quick change reversible shovel which has all the advantages of the prior art shovels of various designs and configurations and none of the disadvantages.

It is another object of the present invention to provide a new and improved quick change reversible shovel which may be easily and efficiently manufactured and marketed.

It is a further object of the present invention to provide a new and improved quick change reversible shovel which is of a durable and reliable construction.

An even further object of the present invention is to provide a new and improved quick change reversible shovel which is susceptible of a low cost of manufacture with regard to both materials and labor, and which accordingly is then susceptible of low prices of sale to the consuming public, thereby making such shovels of various designs and configurations economically available to the buying public.

Still yet another object of the present invention is to provide a new and improved quick change reversible shovel which provides in the apparatuses and methods of the prior art some of the advantages thereof, while simultaneously overcoming some of the disadvantages normally associated therewith.

Even still another object of the present invention is to remove and replace a two-ended shovel blade to increase the life of the device on a handle for using either end to increase the life of the device.

Lastly, it is an object of the present invention to provide a quick change reversible shovel. The shovel comprises a handle of a cylindrical cross-section and of an extended length having a lower attachment end and having an upper gripping end. The handle has a central axis which is linear over the majority of its length and a small bent portion at the first or attachment end. A grip is formed over the handle at the grip end for being held by a user. A blade in a generally rectangular configuration but with a symmetric curve is provided. The blade is thicker along a horizontal center line and comes to a point at the opposite upper and lower ends. The blade has curved side edges parallel with each other coupling the upper and lower edges at the blades. A pair of apertures is formed in the central extent of the blade along the horizontal center line. Attachment means include a ring-like member positionable around the lower end of the handle with an opening. The opening is in contact with the rear face of the blade between the apertures. The ring then has a pair of outwardly extending flanges in a common plane parallel with the rear face of the shovel each with an aperture overlying the aperture of the blade.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective illustration of the preferred embodiment of the new and improved quick change reversible shovel constructed in accordance with the principles of the present invention.

FIG. 2 is a side elevational view of the shovel shown in FIG. 1.

The same reference numerals refer to the same parts throughout the various Figures.

DESCRIPTION OF THE PREFERRED EMBODIMENT

Figure 3:
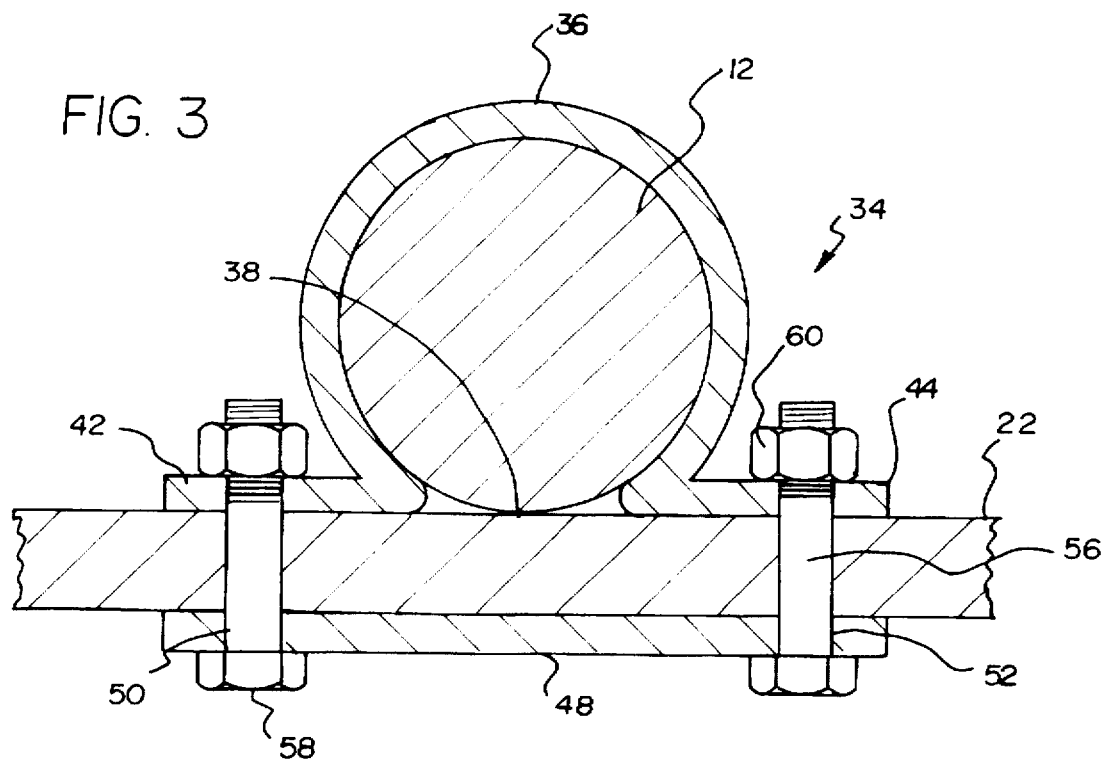
FIG. 3 is a cross-sectional view taken along line 3—3 of FIG. 1.
Figure 4:
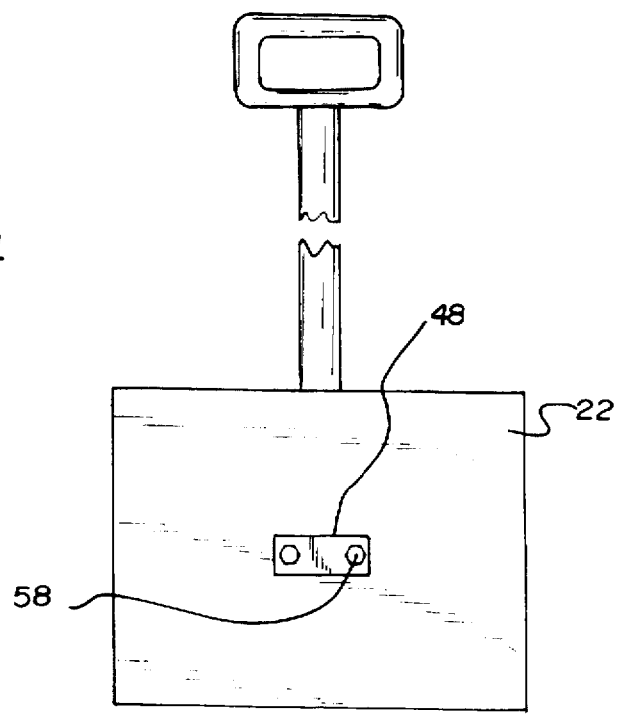
FIG. 4 is a front plan view of the shovel shown in the prior Figures.

With reference now to the drawings, and in particular to FIG. 1 thereof, the preferred embodiment of the new and improved quick change reversible shovel embodying the principles and concepts of the present invention and generally designated by the reference numeral 10 will be described.

The present invention, the new and improved quick change reversible shovel is a system 10 comprised of a plurality of components. In their broadest context, the components include a handle, a grip, a blade and attachment means. Each of the individual components is specifically configured and correlated one with respect to the other so as to attain the desired objectives.

The shovel of the present invention may be considered as a system 10. Such system has as one of its two major components the handle 12. The handle is an elongated member formed of a rigid material such as plastic, wood, or preferably metal. The handle has a cylindrical shape and is solid for increased strength. The handle has a lower gripping end 14 and an upper grasping end 16. The grasping end is covered with a grip 18. The grip is for being held by a user for comfort and to provide a greater friction surface.

The lower end of the handle is of a short extent and is bent at an angle of between about 5 and 15 degrees, preferably about 10 degrees. The purpose of the bent end is for receiving the blade 22 as will be described later for creating a more comfortable angle during operation and use of the system 10.

The next component of the system is the blade 22. The blade has upper and lower edges 24,26 which are sharp and are adapted to contact and shovel snow or other particulate material. The blade is thickest along the horizontal center line 28 and is symmetric upwardly and downwardly with respect thereto. The blade also has parallel or, more preferably, concentric end edges 30,32. The end edges couple the ends of the upper blade edge and lower blade edge.

The next component of the system are the coupling components 34. The major element of the coupling components is a ring 36 which has a hollow circular cross-section sized and positioned for being located over the lower end of the handle. The ring has an open front face forming an opening 38. The opening constitutes between about 15 and 30 degrees of the circumference of the ring. The ring is provided so that the adjacent portion of the handle may extend outwardly therefrom for contacting the back surface of the blade in the region between its two apertures.

The ring is also formed to have integrally formed therewith a pair of symmetrically oriented outwardly disposed flanges 42,44. The flanges are in a common plane in contact with the back surface of the blade. Each of the flanges is provided with an aperture adapted to overlie an associated aperture of the blade.

The last component of the coupling assembly is a small plate 48. The small plate is of a generally rectangular configuration and is positioned on the front face of the blade. It is provided with two apertures 50,52. Such apertures are adapted to overlie the apertures of the blade.

Final coupling between the various components of the coupling assembly and the blade are a pair of bolts 56. The bolts are provided with heads 58 on the exposed exterior face of the plate and blade. Each bolt extends through the aligned apertures of the plate, blade and flange. Associated nuts 60 are threadedly secured to the threaded ends of the bolts for coupling purposes. This allows for the convenient uncoupling of the nuts to separate the blade from the coupling components to allow turning the blade upside down so that the opposite end may be utilized for shoveling purposes as might be required.

The present invention is a snow shovel with a reversible blade. When one edge becomes deformed, the bolts are removed and it is turned over to obtain a fresh cutting edge. Regular snow shovels made out of soft materials are useless once the edge gets bent. The present invention, a steel shovel, would be stronger and also have double the life of an ordinary snow shovel.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by letters patent of the united states is as follows:

1. A quick change reversible shovel comprising, in combination:

a handle of a cylindrical cross-section and of an extended length having a lower attachment end and having an upper gripping end, the handle having a central axis which is linear over the majority of its length and a small bent portion at the first or attachment end, an angle being at between about 5 and 15 degrees from the axis of a major portion of the handle;

a grip formed over the handle at the gripping end for being held by a user;

a blade in a generally rectangular configuration but with a symmetric curve, the blade being thicker along a horizontal center line and coming to a tapered edge at the opposite upper and lower ends, the blade having curved side edges parallel with each other coupling the upper and lower ends of the blade, a pair of apertures formed in a central extent of the blade along the horizontal center line; and attachment means including a ring-like member positionable around the lower end of the handle with an opening constituting between about 15 and 30 percent of the periphery of the ring-like member, the ring-like member then having a pair of outwardly extending flanges in a common plane parallel with a rear face of the blade each with an aperture overlying an aperture of the blade, the attachment means further including a small plate with a pair of apertures overlying the apertures of the blade with associated bolts positionable through the apertures of the plate, blade and flanges with associated nuts for securement purposes.

2. A quick change reversible shovel comprising:

a handle of a cylindrical cross-section and of an extended length having a lower attachment end and having an upper gripping end, the handle having a central axis which is linear over the majority of its length and a small bent portion at the first or attachment end;

a grip formed over the handle at the gripping end for being held by a user;

a blade in a generally rectangular configuration but with a symmetric curve, the blade being thicker along a horizontal center line and coming to a tapered edge at the opposite upper and lower ends, the blade having curved side edges parallel with each other coupling the upper and lower ends of the blade, a pair of apertures formed in a central extent of the blade along the horizontal center line; and attachment means including a ring-like member positionable around the lower end of the handle with an opening, the ring-like member then having a pair of outwardly extending flanges in a common plane parallel with a rear face of the blade each with an aperture overlying an aperture of the blade.

3. The shovel as set forth in claim 2 wherein the attachment means further includes a small plate with a pair of apertures overlying the apertures of the blade with associated bolts positionable through the apertures of the plate, blade and flanges with associated nuts for securement purposes.

* * * * *